United States Patent Office 3,378,960
Patented Apr. 23, 1968

3,378,960
MACHINE TOOL WORKPIECE DRIVING MECHANISM
William B. Seidel, Cincinnati, Ohio, assignor to The Cincinnati Milling Machine Co., Cincinnati, Ohio, a corporation of Ohio
Filed Jan. 13, 1965, Ser. No. 425,213
7 Claims. (Cl. 51—237)

ABSTRACT OF THE DISCLOSURE

A work gripping and rotating drive apparatus in a machine tool, particularly a precision grinding machine, having a jaw portion adjustable to align its axis with that of a workpiece gripped thereby and a driving portion connected to the jaw portion and rotatable on an axis parallel to the axis of the jaw portion.

Background

Figure 1:
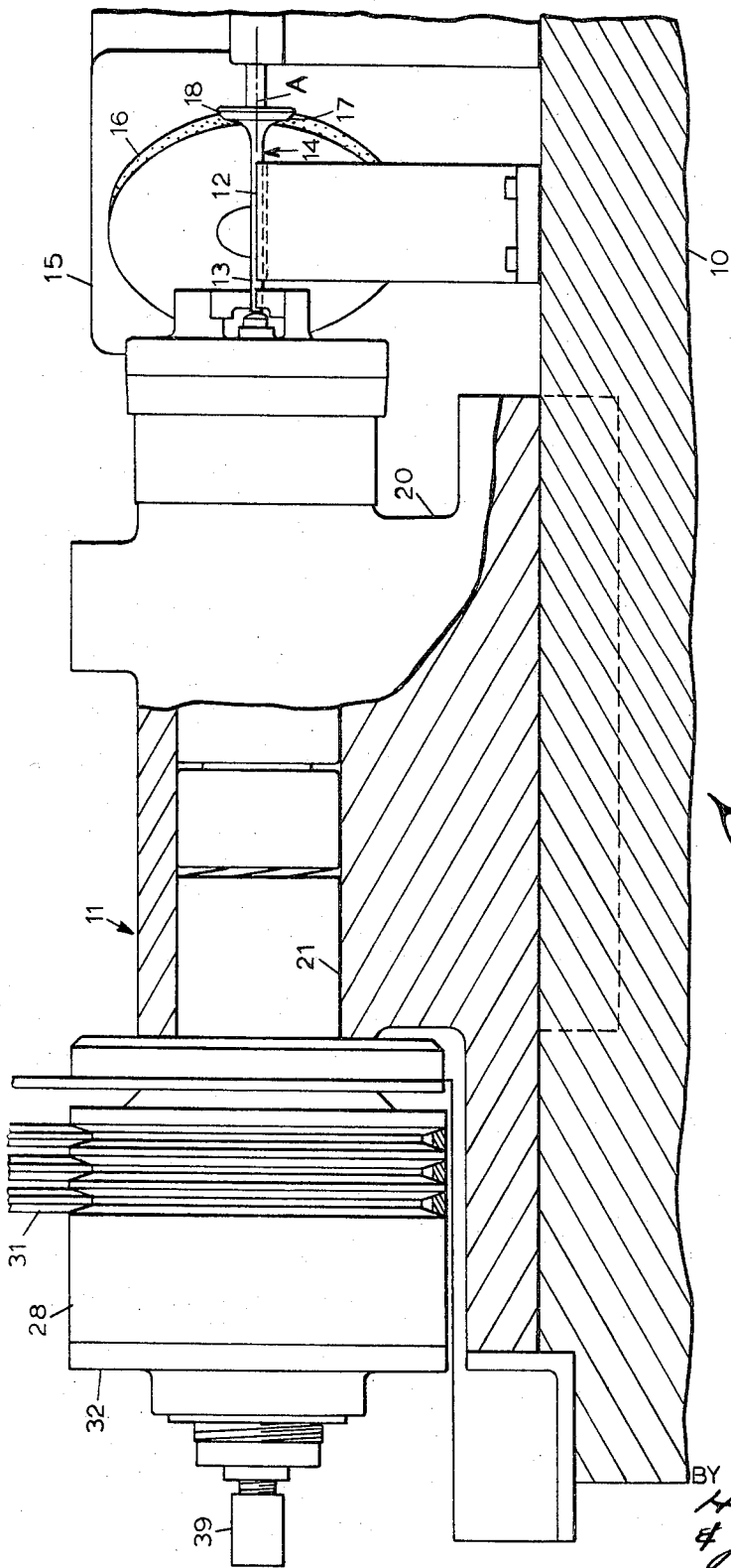

In some grinding operations, a workpiece to be ground is supported on a peripheral surface and is gripped at one end by a chuck for rotation. This arrangement may, for example, be used to grind some surface on the workpiece concentric with the supported surface. One example of this type of operation is grinding the seating surface on the head of a valve, the stem of which is supported in a V-shaped block. For this operation, the end of the valve opposite the valve head is gripped in a chuck for rotation of the valve during grinding. It is important, in this type of grinding operation, that the chuck grip the end of the workpiece on an axis determined by the V-shaped block. If the jaws of the chuck which grip the workpiece rotate about an axis different than the axis of a workpiece supported by the V-shaped block because of misalignment, a poor grind will result.

Summary

In the present invention, apparatus for driving the workpiece is provided which will grip the workpiece on the support determined axis of the workpiece, wherever this axis may be. In the preferred form of the invention, each workpiece can be gripped on the support determined axis even if this axis should change from workpiece to workpiece because of a slight change in the diameter of successive workpieces.

In the preferred form of the invention, a driving member (which may, for example, be a belt driven pulley) is mounted in a housing bearing on a fixed first axis and has a first flexible diaphragm connected thereto. A drive shaft is connected at one end to the first flexible diaphragm and has a second flexible diaphragm connected to the opposite end thereof. A hub is connected to the second diaphragm and a flexible plate, which has jaws carried thereby to grip a workpiece, is connected to the hub. Because of the two flexible diaphragms between the work gripping jaws and the drive member which is mounted on a fixed axis, the jaws can grip a workpiece on a second axis, parallel to the first axis, for rotation thereby. Thus, a workpiece can be driven while supported on a peripheral surface in a fixed support.

Objects

It is therefore one object of the present invention to provide apparatus for driving a workpiece on a support. It is another object of the present invention to provide apparatus for rotating successive workpieces on axes which change from workpiece to workpiece. It is another object of the present invention to provide a chuck having a driving member on a fixed axis and a work gripping member on another axis. It is yet another object of the present invention to provide a chuck having a driving member on a first fixed axis and having a work gripping member to drive a workpiece on a second axis parallel to the first axis. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The drawings

Figure 2:
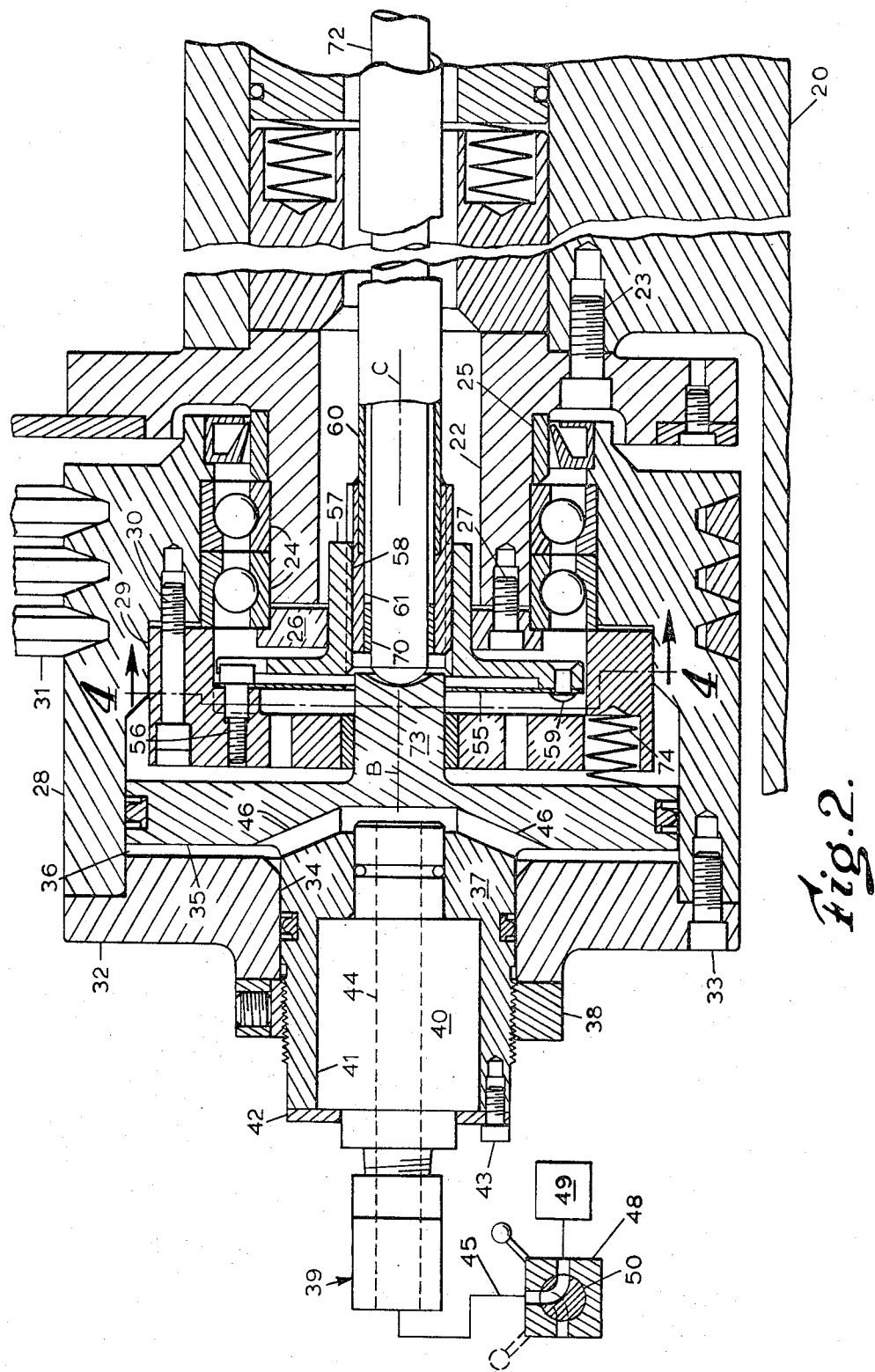
Figure 3:
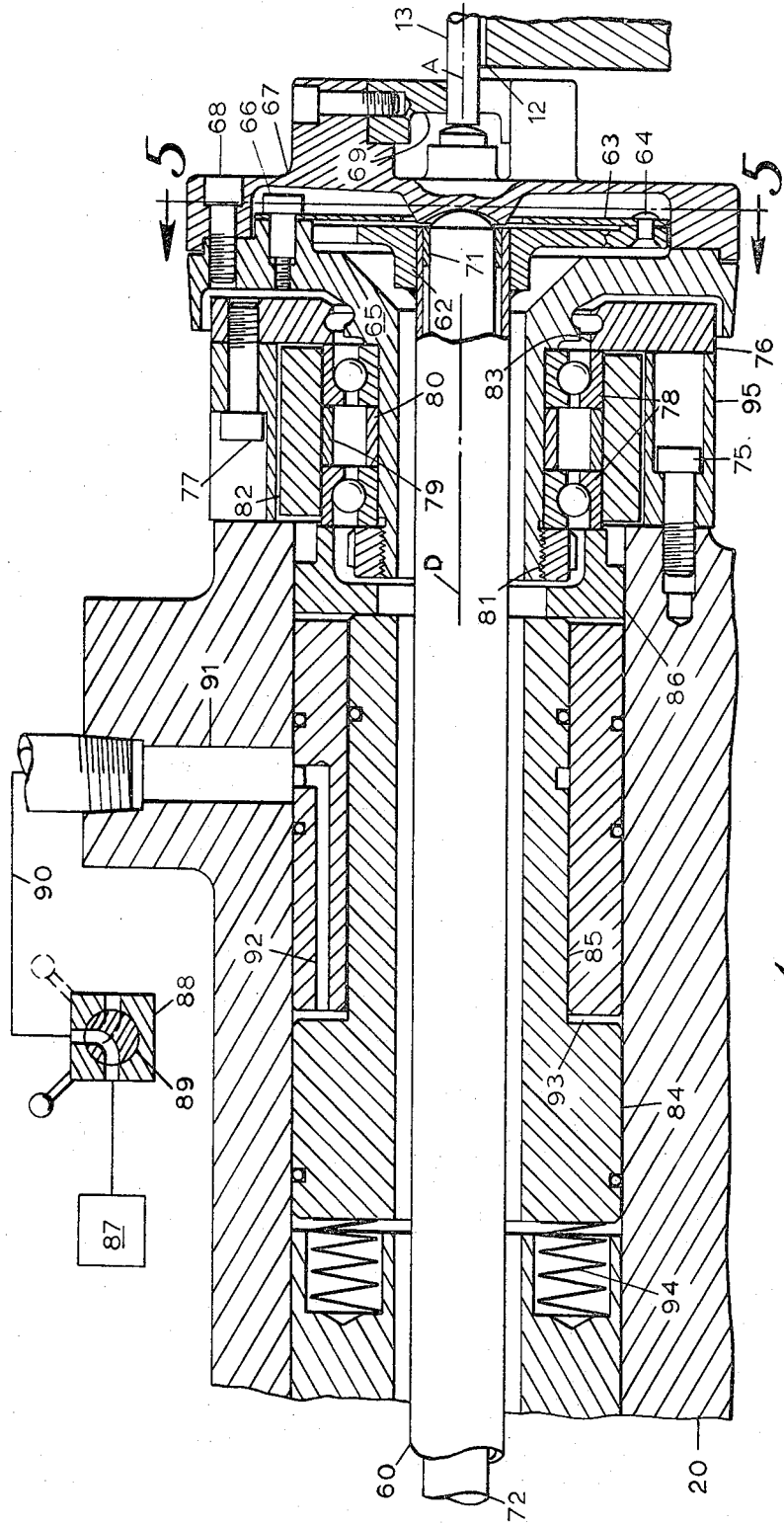
Figure 4:
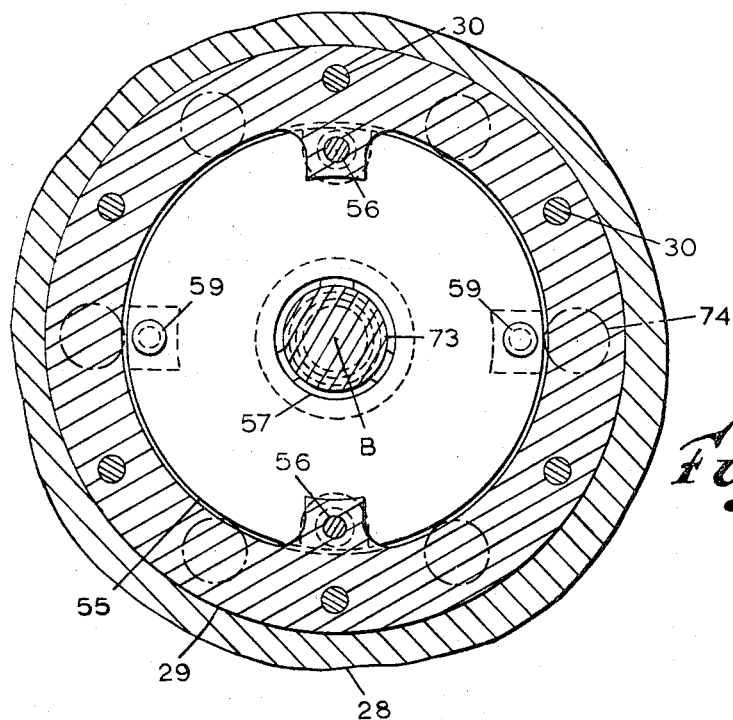
Figure 5:
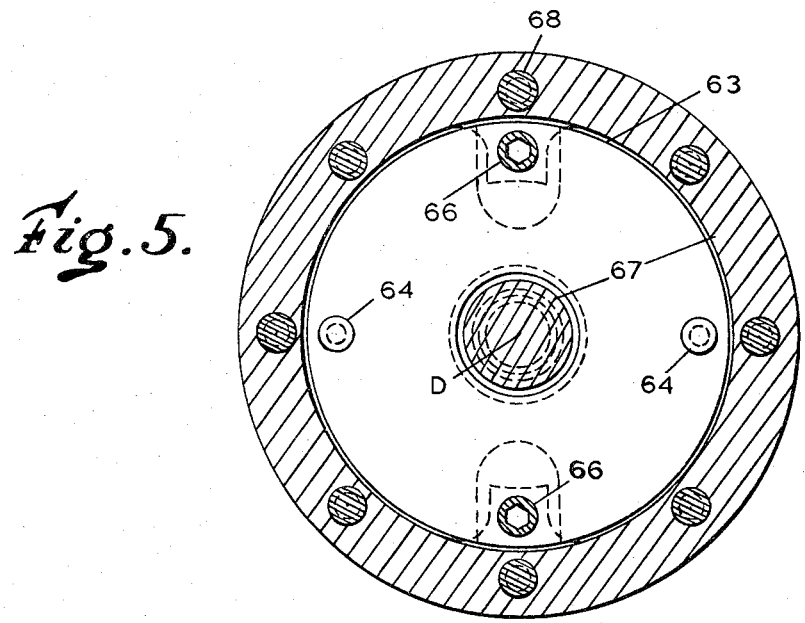

In the drawings:
FIG. 1 is an elevational, fragmentary view, partly in cross-section, of a machine, incorporating the present invention, for grinding seats on valves;
FIG. 2 is an enlarged cross-sectional view, taken as the view of FIG. 1, showing an end of the workpiece driving mechanism;
FIG. 3 is an enlarged cross-sectional view, taken as the view of FIG. 1, showing the other end of the workpiece driving mechanism;
FIG. 4 is a view taken on the line 4—4 of FIG. 2; and
FIG. 5 is a view taken on the line 5—5 of FIG. 3.

Detailed description

There is shown in FIG. 1 a portion of grinding machine. The machine has a base 10 and a headstock 11 secured thereto. A V-shaped block 12 supports the stem 13 of a valve 14 therein on an axis A. A wheelhead 15, mounted on base 10, has a rotating grinding wheel 16 which grinds the seating surface 17 on the head 18 of the valve.

The headstock has a housing 20 which has a horizontal bore 21 therein. As shown in FIG. 2, a nose piece 22 is connected to the housing, by bolts 23, at one end of the bore and two bearings 24 are received thereon. These bearings are secured on the nose piece between a spacer ring 25 and a clamp ring 26 which is secured to the end of the nose piece by bolts 27. A pulley 28 is received over the bearings 24 and has an annular pulley block 29 secured thereto by bolts 30. The pulley 28 is driven through belts 31 by a motor (not shown). An end plate 32 is connected to the pulley by bolts 33. The pulley 28, pulley block 29, and end plate 32 define a drive member which is rotated by pulley belts 31 on axis B. The end plate 32 has a central bore 34. A piston 35, received in chamber 36 between pulley block 29 and end plate 32, has a central, horizontally extending nose 37 which extends through bore 34. Nose 37 has a nut 38 thereon to limit the axial movement of the nose and piston to the right (as viewed in FIG. 2). A high speed union, indicated generally at 39, is provided to introduce air selectively behind the piston. The outer casing 40 of the union is snugly received in a central bore 41 of nose piece 37 and secured therein by a clamp ring 42 connected to the end of nose piece 37 by bolts 43. Ball bearings (not shown) received in casing 40, carry a tube 44 which is connected at one end to air line 45 and which terminates within the casing. Air discharged through tube 44 passes out the end of casing 40, through passages 46 in the piston, and into chamber 36 behind piston 35. A valve 48, connected in air line 45, connects chamber 36 (behind the piston) to a source 49 of air under pressure when the rotatable valve member 50 is in the position shown in solid lines in FIG. 2. Chamber 36 (behind the piston) is connected to atmosphere through valve 48 when valve member 50 is rotated ninety degrees counterclockwise (as indicated by dotted lines in FIG. 2).

A thin flexible annular diaphragm 55, made of spring steel, is connected to the drive member (or, more specifically, to the pulley block 29 thereof) by two bolts 56 spaced 180 degrees apart (only one of which is shown in FIG. 2). A fitting 57, with a splined central bore 58, is riveted to the diaphragm by two rivets 59 (one of which is shown 90 degrees out of position in FIG. 2), spaced 180 degrees apart and each 90 degrees from bolts 56. Since the fitting 57 is connected to the drive member only through the flexible diaphragm 55, the fitting can be deflected with respect to axis B.

A tubular drive shaft 60, having a central axis C, has an externally splined sleeve 61 welded to one end and received into bore 58. As shown in FIG. 3, the opposite end of the drive shaft is received in, and welded to, fitting 62. Fitting 62 is riveted to a thin, flexible, annular diaphragm 63 by two rivets 64 spaced 180 degrees apart (only one is shown in FIG. 3). The diaphragm 63 is connected to a hub 65 by two bolts 66 (one of which is shown 90 degrees out of position in FIG. 3) spaced 180 degrees apart and each spaced 90 degrees from rivets 64. The hub 65 has a flexible jaw supporting plate 67 connected thereto by bolts 68. The plate 67 has three angularly spaced jaws 69 connected thereto. When the plate is relaxed, the jaws grip the work piece 14. When the plate is deflected (by movement of the center of the plate to the right as viewed in FIG. 3) the jaws open to release the workpiece.

The tubular shaft 60 has, at each end, a bushing 70, 71 which support a push rod 72 slidably received in the bushings. Piston 35 has a central projection 73 extending through diaphragm 55 and engaging one end of push rod 72. The other end of push rod 72 extends through diaphragm 63 and engages the center of the jaw plate 67. When the push rod 72 is moved to an extreme forward position (to the right as viewed in FIGS. 2 and 3) by piston 35, the jaws are open. When chamber 36 is exhausted to the atmosphere (by turning valve member 50 to the position shown in dotted lines in FIG. 2) the six springs 74, which are interposed between piston 35 and the pulley block 29, move the piston to an extreme rear (or left hand position as viewed in FIG. 2). This allows the jaw plate 67 to assume the relaxed position with the jaws therein gripping the workpiece.

A ring 95, connected to the housing by bolts 75, has an annular plate 76 connected thereto by bolts 77. Two bearings 78, separated by annular spacers 79, 80 are secured on hub 65 by nut 81. A ring 82, tightly received on bearings 78, fits inside ring 95 with clearance. The drive shaft 60 extends through the hub 65 which extends through the central opening 83 in annular plate 76, and the right end of the shaft 60, and all members carried thereby (including fitting 62, diaphragm 63, hub 65, jaw plate 67, bearings 78, and ring 82) are free to move laterally with respect to the fixed axis B of the drive member (by virtue of the flexible diaphragm 55) unless restrained. Thus, the right end of drive shaft 60, when clamped to a workpiece supported by V-shaped block 12, will assume a position determined by the workpiece. Because diaphragms 63 is flexible, the central axis D of hub 65 will align itself with axis A of the workpiece. Thus, since the stem 13 of the workpiece is supported parallel to axis B of the drive member, the axis D of the hub 65 will be parallel to axis B, although not necessarily in alignment therewith. After the right end of drive shaft 60 has assumed the proper position to drive the particular workpiece (which may not be identical in diameter to every other workpiece) on the support, the shaft must be kept in this position. This is accomplished by a hollow piston 84, slidably received in the housing over drive shaft 60. The piston has a shank, or rod, 85 engaged with clamp ring 86. When hydraulic fluid from a source 87 under pressure is connected, through valve 88, (if rotatable valve member 89 is in the position indicated by solid lines) line 90 and passages 91, 92, to a chamber 93, the piston is shifted against the bias of springs 94. This loosens clamp ring 86 and permits hub 65 to seek an axis determined by the supported workpiece. When valve member 89 is in the position indicated by dotted lines, the chamber 93 is exhausted to atmosphere and the clamp ring 86 (under the influence of springs 94 acting through piston 84 and shank 85) presses the bearings between ring 86 against plate 76, which is connected to the housing through ring 95. This locks the hub 65, the jaw plate 67, and the three jaws 69, on the axis determined by the workpiece resting in the support block 12.

What is claimed is:

1. In a machine tool, workpiece driving apparatus comprising:
    (a) a housing,
    (b) a drive member mounted in the housing for rotation therein on a fixed first axis, said drive member having a first flexible diaphragm mounted thereon,
    (c) a drive shaft having one end connected to said first diaphragm for rotation thereby, said drive shaft having a second flexible diaphragm connected to the other end thereof,
    (d) a hub connected to the second diaphragm having means thereon to grip the workpiece for rotation,
    (e) and means selectively to clamp the hub in the housing for rotation on a second axis parallel to said first axis.

2. In a machine tool, workpiece driving apparatus comprising:
    (a) a housing having a first bearing secured on a first axis,
    (b) a drive member rotatably carried by said first bearing, said drive member having a first flexible diaphragm mounted thereon,
    (c) a drive shaft having one end connected to said first diaphragm for rotation thereby, said drive shaft having a second flexible diaphragm connected to the other end thereof,
    (d) a hub connected to the second diaphragm having a second bearing secured thereto, said hub having means to grip a workpiece, said hub and second bearing movable laterally with respect to said first axis when unrestrained.
    (e) and means selectively to clamp said second bearing on a second axis parallel to said first axis.

3. In a machine tool, workpiece driving apparatus comprising:
    (a) a housing having a first bearing secured on a first axis,
    (b) a drive member rotatably carried by said first bearing, said drive member having a first flexible diaphragm mounted thereon,
    (c) a drive shaft having one end connected to said first diaphragm for rotation thereby, said drive shaft having a second flexible diaphragm connected to the other end thereof,
    (d) a hub connected to the second diaphragm having a second bearing secured thereto, said hub and second bearing movable laterally with respect to said first axis when unrestrained,
    (e) means to clamp said second bearing in the housing,
    (f) a flexible jaw support plate mounted on the hub and having a plurality of jaws thereon, said jaws operable to grip and release workpieces in response to deflection of said jaw support plate,
    (g) and means to deflect said jaw support plate.

4. In a machine tool, workpiece driving apparatus comprising:
    (a) a housing having a first bearing secured on a first axis,
    (b) a drive member rotatably carried by said first bearing, said drive member having a first flexible diaphragm mounted thereon,
    (c) a drive shaft having one end connected to said first diaphragm for rotation thereby, said drive shaft having a second flexible diaphragm connected to the other end thereof, (d) a hub connected to the second diaphragm having a second bearing secured thereto, said hub and second bearing movable laterally with respect to said first axis when unrestrained, (e) a piston mounted in the housing and shiftable therein when actuated to clamp the second bearing on a second axis parallel to said first axis, and (f) means on the hub to grip the workpiece.

5. In a machine tool, workpiece driving apparatus comprising:

(a) a housing having a first bearing secured on a first axis, (b) a drive member rotatably carried by said first bearing, said drive member having a first flexible diaphragm mounted thereon, (c) a drive shaft having one end connected to said first diaphragm for rotation thereby, said drive shaft having a second flexible diaphragm connected to the other end thereof, (d) a hub connected to the second diaphragm having a second bearing secured thereto, said hub and second bearing movable laterally with respect to said first axis when unrestrained, (e) means to clamp said second bearing in the housing, (f) a flexible jaw support plate mounted on the hub and having a plurality of jaws thereon, said jaws selectively gripping and releasing workpieces in response to deflection of said jaw plate, (g) and a piston mounted in the housing operable when actuated to deflect said jaw plate.

6. In a machine tool, workpiece driving apparatus comprising:

(a) a housing having a first bearing secured on a fixed axis, (b) a drive member rotatably carried by said first bearing, said drive member having a first flexible diaphragm mounted thereon, (c) a hollow drive shaft having one end connected to said first diaphragm for rotation thereby, said drive shaft having a second flexible diaphragm connected to the other end thereof, (d) a hub connected to the second diaphragm having a second bearing secured thereto, said hub and second bearing movable laterally with respect to said first axis when unrestrained, (e) means to clamp said second bearing in the housing, (f) a flexible jaw support plate mounted on the hub and having a plurality of jaws thereon, said jaws selectively gripping and releasing workpieces in response to deflection of said jaw plate, (g) a push rod extending through the drive shaft, (h) a piston mounted in the housing and shiftable therein when actuated to shift the push rod axially and deflect the jaw plate.

7. In a machine tool, workpiece driving apparatus comprising:

(a) a housing having a first bearing secured on a first axis, (b) a drive member rotatably carried by said first bearing, said drive member having a first flexible diaphragm mounted thereon, (c) a hollow drive shaft having one end connected to said first diaphragm for rotation thereby, said drive shaft having a second flexible diaphragm connected to the other end thereof, (d) a hub connected to the second diaphragm having a second bearing secured thereto, said hub and second bearing movable laterally with respect to said first axis when unrestrained, (e) a first piston mounted in the housing and shiftable therein when actuated to clamp the second bearing in the housing on a second axis parallel to said first axis, (f) a flexible jaw support plate mounted on the hub and having a plurality of jaws thereon, said jaws selectively gripping and releasing workpieces in response to deflection of said jaw plate, (g) a push rod extending through the drive shaft, (h) a piston mounted in the housing and shiftable therein when actuated to shift the push rod axially and deflect the jaw plate.

References Cited

UNITED STATES PATENTS

| | | |
|---|---|---|
| 2,026,639 | 1/1936 | Klay. |
| 2,381,488 | 8/1945 | Coulson. |
| 2,757,493 | 8/1956 | Hannon _____ 51—237 |
| 2,778,163 | 1/1957 | Plygare _____ 51—105 |
| 2,784,534 | 3/1957 | Townsend. |
| 2,832,906 | 4/1958 | Koons _____ 64—13 XR |
| 2,997,863 | 8/1961 | Stone _____ 64—13 |
| 3,056,238 | 10/1962 | Hahn _____ 51—236 XR |

HAROLD D. WHITEHEAD, *Primary Examiner.*